*Inventor*
ROY SINGLETON

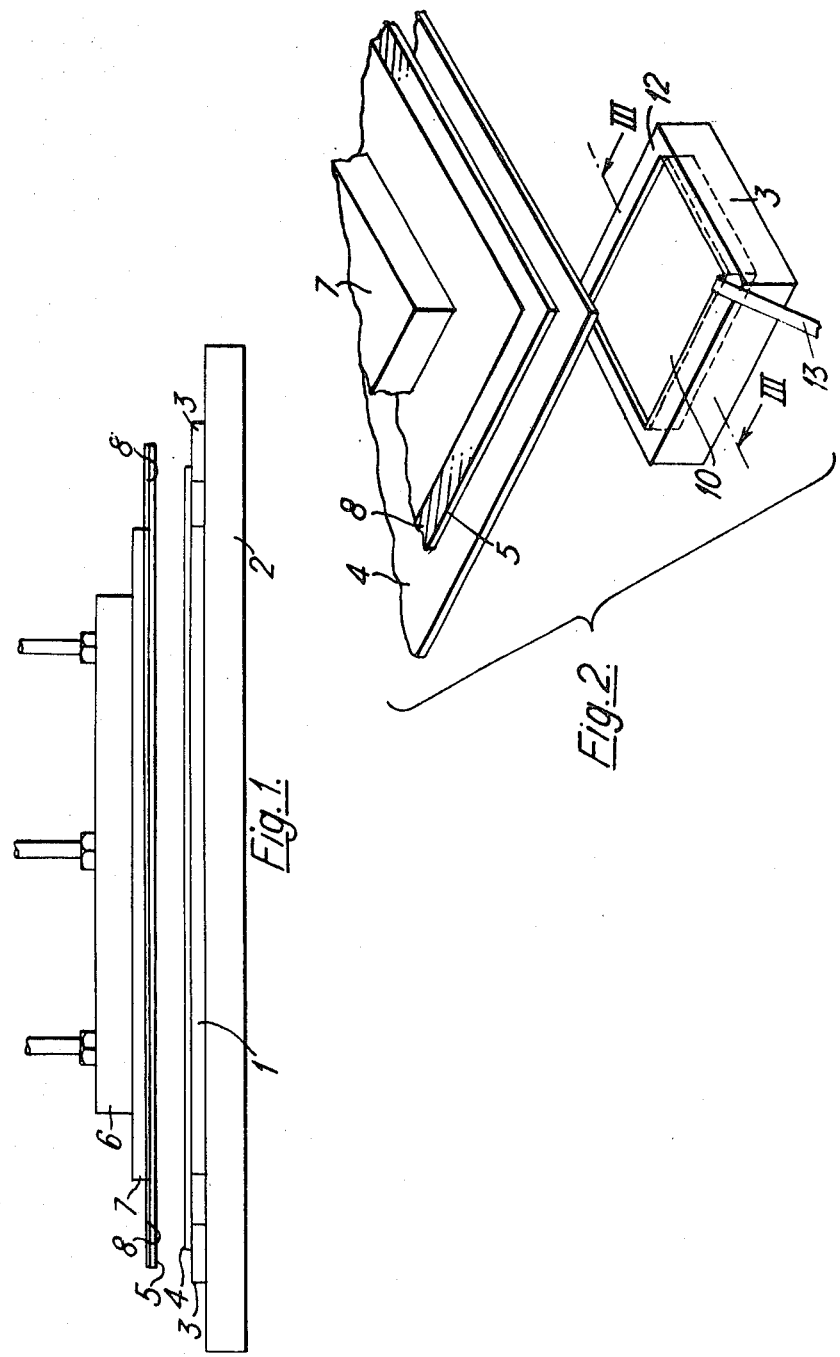

United States Patent Office 3,600,251
Patented Aug. 17, 1971

3,600,251
APPARATUS FOR APPLYING AN ELECTRIC ARC BETWEEN ELECTRICALLY CONDUCTING ELEMENTS AND A CONDUCTIVE STRIPE ON GLASS
Roy Singleton, Eccleston, St. Helens, England, assignor to Pilkington Brothers Limited, Lancashire, England
Filed June 2, 1969, Ser. No. 829,175
Claims priority, application Great Britain, June 7, 1968, 27,291/68
Int. Cl. B29c 27/04
U.S. Cl. 156—380          8 Claims

ABSTRACT OF THE DISCLOSURE

Apparatus for applying electric current to a conducting stripe on glass, includes means for supporting the glass and electrically conductive elements, each with an extended arcing face, positioned relative to said supporting means so as to lie adjacent parts of the stripe to which electrical connection is to be made, whereby on connecting said elements to a current source an electric arc strikes between said arcing face of each element and the conductive stripe on the glass.

BACKGROUND OF THE INVENTION

(1) Field of the invention

This invention relates to the heating of a glass element by the application of electric current to a conducting stripe on the glass and more especially to the application of electric current to conducting stripes on the edges of a glass sheet which is to form part of a peripherally welded double glazing unit.

(2) Description of the prior art

It is known in the manufacture of peripherally welded double glazing units to hold the upper sheet of glass by a vacuum platen at a predetermined distance above the lower sheet which rests on a hearth. An electrically conductive stripe, for example, a graphite, is painted around the periphery of the upper face of the upper sheet of glass held by the vacuum platen and when the two glass sheets, which have passed through a pre-heating stage, are square above each other, electrical connection is made to the peripheral stripe so that electric current passes through the stripe causing heating of the underlying glass sufficiently to render the glass conductive, the current then passing through the glass to permit the edges of the upper sheet to sag and ultimately become united with the edges of the lower sheet of glass which is also peripherally heated by heat radiated from the softened edges of the upper sheet.

It has been customary to make electrical connection to the stripe by striking arcs between fixed pointed electrodes and the stripe or by using flame electrodes, and hitherto it has always been necessary to ensure that the upper sheet carrying the peripheral stripe is accurately positioned relative to the vacuum platen so as to ensure accurate spacing between the corners of the glass sheet and the electrodes from which arcs are to be struck to those corners.

This has meant critical positioning of the upper sheet on the vacuum platen as well as critical positioning of the electrodes, and it is a main object of the present invention to permit greater tolerance in the positioning of the sheets of glass relative to the electrodes by which electrical connection is made to the conductive stripe.

SUMMARY

According to the invention apparatus for applying electric current to a conducting stripe on glass, includes means for supporting the glass, and electrically conductive elements, each with an extended arcing face, positioned relative to said supporting means so as to lie adjacent parts of the stripe to which electrical connection is to be made, whereby on connecting said elements to a current source an electric arc strikes between said arcing face of each element and the conductive stripe on the glass.

The electrically conductive elements with their extended surface area may be positioned above or below the glass carrying the conducting stripe and in embodiments where there is any possibility of physical contact of the glass with the electrically conductive elements it is preferable to protect those elements from such contact.

Each of the electrically conductive elements may be mounted in a recess in an electrically insulating block, with its extended arcing face countersunk below the surface of the block. In this embodiment, when a glass sheet bears against the block, the electrically conductive element does not make physical contact with the glass. In some applications, however, each conductive element may be arranged so that the glass rests on the extended arcing face of the element. In any of these applications, each electrically conductive element may comprise a conductive coating on an electrically insulating block.

The invention also comprehends apparatus for use in the manufacture of welded double glazing unit comprising a hearth carrying a platen for supporting a lower glass sheet of the unit, four insulating blocks with electrically conductive elements, each with an extended arcing face, located on the hearth so as to underlie and support the corners of the lower glass sheet, and vertically displaceable vacuum means mounted above the hearth to hold spaced from the lower glass sheet an upper glass sheet carrying a peripheral electrically conductive stripe around its upper face, whereby after lowering the upper sheet to a desired distance above the lower sheet, an electric arc can be struck from said arcing face of each element to the peripheral stripe on the upper sheet so that heating current passes through the stripe to soften the periphery of the upper sheet.

BRIEF DESCRIPTION OF THE DRAWINGS

FIG. 1 is a side elevation of apparatus, by way of example, for use in the manufacture of a welded double glazing unit, embodying apparatus for applying electric current to a conducting stripe on the upper sheet of glass;

FIG. 2 is a fragmentary exploded view of one corner of the apparatus of FIG. 1;

DESCRIPTION OF THE PREFERRED EMBODIMENT

Figure 3:
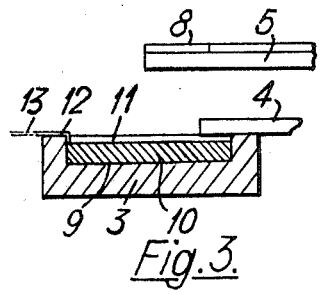
FIG. 3 is a section on line III—III of FIG. 2.

FIG. 1 illustrates diagrammatically apparatus for use in the manufacture of peripherally welded double glazing units. A platen 1 is carried on a hearth 2 and four corner blocks 3 of electrically insulating material are positioned on the hearth 2 at the corners of the platen 1 so as to support the corners of a lower glass sheet 4 which is to form one pane of the double glazing unit.

This lower glass sheet 4 has been pre-heated in the usual manner before being placed on the platen 1. A second sheet of glass 5 which constitutes the upper sheet of the double glazing unit is held by a vacuum arrangement including a chuck vacuum platen 6 and an auxiliary platen 7 which is held by vacuum to the lower face of the chuck platen and is of a size complementary to the size of the sheet of glass 5.

The upper sheet 5 carries on its upper face a peripheral electrically conductive stripe 8 for example of colloidal graphite which is painted onto the upper face of the sheet prior to the pre-heating of that sheet. Both the sheets 4 and 5 are at about the same temperature when they are located at the welding station in the relative positions indicated in FIG. 1.

Each of the corner blocks 3 of electrically insulating material is formed with an upwardly facing recess 9 in which there is housed an electrically conductive element 10 of rectangular form having an upper surface 11 which constitutes an extended arcing face. The element 10 is, for example, of carbon, and its thickness is less than the depth of the recess 9 so that the upper surface 11 of the element is countersunk below the plane of the upper surface 12 of the block 3. An electrical connection 13 is made to the element 10.

The corners of the lower sheet 4 which is supported on the lower platen 1 rest on the upper surfaces 12 of the blocks 3 which are coplanar with the upper surface of the platen 1. The blocks 3 may be positioned so that the lower glass sheet 4 does not overlie the conductive elements 10 although, in the embodiment illustrated, if the glass were of such a size that it did overlie the conductive elements there would be no physical contact with those elements because they are countersunk below the surfaces 12 of the blocks. When an electric current supply source is connected to two of the electrically conductive elements 10 through the connections 13, electric arcs are struck from their upper surfaces 11 to the conductive stripe 8 on the upper glass sheet 5 and current flows through the conductive stripe. It is customary to pass current through the stripe on each side of the upper glass sheet in turn by a cyclic switching of the current supply source to the elements 10 so that the arcs are struck cyclically to the stripe 8 and a uniform heating around the periphery of the upper sheet 5 is achieved causing that periphery to droop and sag until it makes contact and becomes integral with the periphery of the lower sheet 4. The electric arc between each of the elements 10 and the stripe 8 may strike from anywhere on the extended arcing face 11 of the element 10 so that there is no necessity for accurate location of the periphery of the upper sheet 5 relative to the blocks 3 on the hearth and the necessity for critical location of the glass sheets in order to produce the desired electric arc is avoided.

Figure 4:
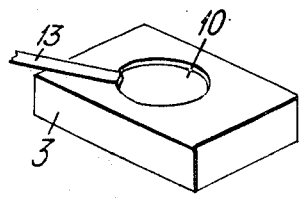
FIGS. 4 to 6 each illustrate variations of details of the shape of the electrically conductive elements.
Figure 5:
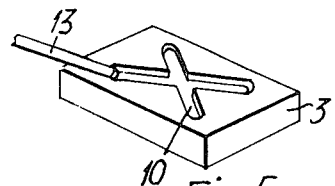
Figure 6:
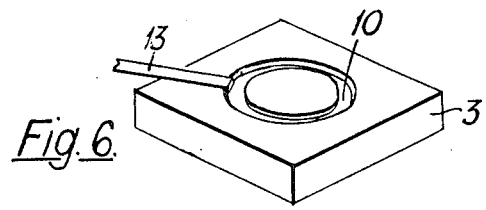

Each of the electrically conductive elements 10 can have a variety of suitable shapes, for example circular as illustrated in FIG. 4, cross-shaped as shown in FIG. 5, or annular as shown in FIG. 6. In each of these embodiments the thickness of the conductive element 10 is such that its upper surface is sunk below the upper surface of the electrically insulating block 3 in which the element is mounted.

Figure 7:
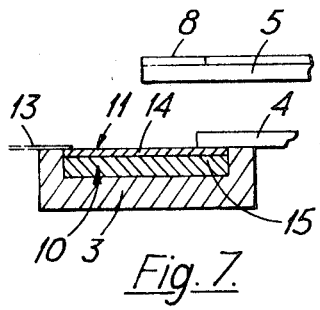
FIG. 7 is a similar view to that of FIG. 3, illustrating a modified form of electrically conductive element.

However, in the embodiment shown in FIG. 7, the thickness of each element 10 is such that its upper surface or extended arcing face does contact the lower glass sheet 4, the sheet thus resting on the arcing face of the element 10 and, at least in this embodiment, also on the upper surface 12 of the mounting block 3. A further difference is that each element 10 comprises a conductive coating 14 on an electrically insulating block 15.

Carbon is a suitable material for the elements 10 or coatings 14 because of its good electrical conductivity and its refractory nature. Alternatively refractory metals, e.g. tungsten, may be used. Preferably the electrically insulating material constituting the blocks 3 and/or the blocks 15 is thermally insulating and is not liable to stick to any hot glass which may come into contact with the blocks. A suitable insulating material is steatite soapstone.

I claim:
1. Apparatus for applying electric current to a conducting stripe on glass, including means for supporting the glass and electrically conductive elements, each with an extended arcing face, positioned relative to said supporting means so as to lie adjacent parts of the stripe to which electrical connection is to be made, whereby on connecting said elements to a current source an electric arc strikes between said arcing face of each element and the conductive stripe on the glass.

2. Apparatus according to claim 1, wherein each of the electrically conductive elements is mounted in a recess in an electrically insulating block, with its extended arcing face countersunk below the surface of the block.

3. Apparatus according to claim 1, wherein each of the electrically conductive elements is mounted in a recess in an electrically insulating block, the glass resting on the extended arcing face of the element.

4. Apparatus according to claim 2, wherein each of the electrically conductive elements comprises a conductive coating on an electrically insulating block.

5. Apparatus according to claim 2, wherein the electrically conductive elements or coatings are formed of carbon or a refractory metal, e.g. tungsten, and wherein the electrically insulating blocks are formed of steatite soapstone.

6. Apparatus for use in the manufacture of a welded double glazing unit, comprising a hearth carrying a platen for supporting a lower glass sheet of the unit, four insulating blocks with electrically conductive elements each with an extended arcing face, located on the hearth so as to underlie and support the corners of the lower glass sheet, and vertically displaceable vacuum means mounted above the hearth to hold spaced from the lower glass sheet an upper glass sheet carrying a peripheral electrically conductive stripe around its upper face, whereby after lowering the upper sheet to a desired distance above the lower sheet, an electric arc can be struck from said arcing face of each element to the peripheral stripe on the upper sheet so that heating current passes through the stripe to soften the periphery of the upper sheet.

7. Apparatus for applying electric current to a conducting stripe on glass, including means for supporting the glass and electrically conductive elements, each said conductive element having an extended arcing face, being mounted in a recess in an electrically insulating block and comprising a conductive coating on an electrically insulating block, and each said conductive element being positioned relative to said supporting means so as to lie adjacent parts of the stripe to which electrical connection is to be made, whereby on connecting said elements to a current source an electric arc strikes between said arcing face of each element and the conductive stripe on the glass.

8. Apparatus for applying electric current to a conducting stripe on glass, including means for supporting the glass and electrically conductive elements, each said conductive element having an extended arcing face, being mounted in a recess in an electrically insulating block of steatite soapstone and being formed of carbon or a refractory metal, e.g. tungsten, and each said conductive element being positioned relative to said supporting means so as to lie adjacent parts of the stripe to which electrical connection is to be made, whereby on connecting said elements to a current source an electric arc strikes between said arcing face of each element and the conductive stripe on the glass.

References Cited
UNITED STATES PATENTS

| | | | |
|---|---|---|---|
| 3,232,811 | 2/1966 | Coulter et al. | 156—273 |
| 3,397,278 | 8/1968 | Pomerantz | 156—272X |

BENJAMIN A. BORCHELT, Primary Examiner

J. J. DEVITT, Assistant Examiner

U.S. Cl. X.R.

156—272